United States Patent [19]
Wirtz

[11] Patent Number: 5,582,278
[45] Date of Patent: Dec. 10, 1996

[54] PULSE WIDTH MODULATED SOLENOID VALVE FOR CONTROL OF HYDRODYNAMIC TORQUE CONVERTERS

[75] Inventor: Hans-Peter Wirtz, Cologne, Germany

[73] Assignee: Ford Motor Company, Dearborn, Mich.

[21] Appl. No.: 440,601

[22] Filed: May 15, 1995

[30] Foreign Application Priority Data

Jul. 22, 1994 [DE] Germany .......................... 44 26 147.0

[51] Int. Cl.$^6$ ..................... F16H 45/02; F15B 13/043; F16K 31/06
[52] U.S. Cl. ......................................... 192/3.3; 192/109 F
[58] Field of Search .................................. 192/3.3, 109 F; 251/128.15, 129.05

[56] References Cited

U.S. PATENT DOCUMENTS

| | | | |
|---|---|---|---|
| 4,744,269 | 5/1988 | Greene et al. | 192/3.3 X |
| 5,058,716 | 10/1991 | Lippe et al. | 192/3.3 X |
| 5,119,914 | 6/1992 | Dadel et al. | 192/109 F X |

FOREIGN PATENT DOCUMENTS

| | | |
|---|---|---|
| 0419782 | 4/1991 | Germany . |
| 0433619 | 6/1991 | Germany . |

OTHER PUBLICATIONS

"Kraftfahrzeugtechnik", Gerigk et al, Westerman–Verlag, 2nd Edition, pp. 349–351.

*Primary Examiner*—Rodney H. Bonck
*Attorney, Agent, or Firm*—Frank G. McKenzie

[57] ABSTRACT

A pulse width modulated solenoid valve for control of hydrodynamic torque converters of automatic transmissions, comprising an electromagnetic switching element (11) and a valve body (12), wherein the valve body (12) has: an end (13) facing the switching element; an end (14) remote from the switching element; a control pressure chamber (15) for a fluid medium; a control spool (28) with at least one control groove (29a); a control pressure connection (20) to the control pressure chamber (15) for the fluid medium; at least one first pressure connection (22) connecting the control pressure chamber (15) to at least one outlet (21); at least one second pressure connection (24, 26) connecting at least one working chamber (16, 17) with at least one outlet (23, 25); at least one counter-pressure chamber (18) located at the opposite end of the valve body (12) to the control pressure chamber (15); at least one pressure connection (20, 22, 24, 26) being capable of being connected to at least one outlet (21, 23, 25) through a control groove (29a, 29b, 29c) on the control spool (28); wherein at least one spring element (27) is arranged in the counter-pressure chamber (18) the spring element (27) providing a counter-force to inhibit high accelerations of the control spool (28) in the direction away from the electromagnetic switching element (11).

5 Claims, 4 Drawing Sheets

PULSE WIDTH MODULATED SOLENOID VALVE FOR CONTROL OF HYDRODYNAMIC TORQUE CONVERTERS

BACKGROUND OF THE INVENTION

1. Field of The Invention

The invention relates to a pulse width modulated solenoid valve for control of hydrodynamic torque converters of automatic transmissions.

2. Description of the Prior Art

Automatic transmissions of motor vehicles are generally equipped with hydrodynamic torque converters such as are described, for example, in EP-A 0 433 619 or EP-A 0 419 782, or in the book by Gerigk, Bruhn & Danner, "Kraftfahrzeugtechnik", Westerman-Verlag, 2nd edition, pages 349–351. Hydrodynamic torque converters enable the vehicle to move off gently and smoothly at low rotational speeds of the output shaft of the engine and facilitate smooth gear-shifting of the automatic transmission. The use of hydrodynamic torque converters results in a low-noise, low-wear, and stepless transfer of the engine torque to the transmission.

Hydrodynamic torque converters comprise an impeller connected to the engine output shaft, a stator supported through a freewheel, and a turbine wheel connected to the shaft leading to the gearbox. The housing of the torque converter, in which these parts are arranged, is completely filled through a system of oil lines with a pressure fluid, which in the case of motor vehicles is usually hydraulic oil. The pressure in the hydrodynamic torque converter is regulated by means of control valves. The invention will be explained hereinafter with reference to hydraulic oil, though it will be understood that it is in no way limited to the use of hydraulic oil as pressure medium.

At low input rotational speeds, the impeller transfers part of the kinetic energy to the hydraulic oil, which at the same time sets the turbine wheel in motion. By means of the stator, the oil flow is diverted so as to amplify the action of the impeller. This state of the torque converter is known as "unlock".

At low rotational speeds, a clutch unit arranged between the impeller and connected to the drive and to the turbine wheel connects the impeller positively to the turbine wheel. This state is known as "lock-up".

Through the positive transfer of the torque in the "lock-up" state, any unsteady behavior of the drive is transmitted directly through the torque converter to the transmission, thereby adversely affecting the driving behavior of the vehicle.

To ensure that the torque is also transferred smoothly in the "lock-up" stated particularly during gear-shifting, the slip between the impeller and the turbine wheel can be varied. By means of control valves, the pressure of the hydraulic fluid within the torque converter is changed so that the clutch device is opened for short periods. The clutch then slips, that is to say, the slip between the impeller and the turbine wheel increases and abrupt, short-term changes in torque due to unsteady drive behavior can thus be compensated for.

For control of the clutch device, the hydrodynamic torque converter has two inlets controlled by means of a control valve which are provided with hydraulic oil under pressure according to the state of engagement of the clutch device. The first of the two inlets is situated directly on the converter housing and acts on the engaging side of the clutch, while the second inlet is connected to the disengaging side of the clutch device.

At low speeds of rotation of the turbine wheel, a lower pressure is applied at the first inlet of the clutch device, while the second inlet is subjected to a markedly higher pressure. The pressure difference between the inlets causes the clutch device to move away and thereby to disengage. The hydraulic oil flowing through the second inlet into the clutch device flows through the clutch device into the converter housing and thence via the first inlet into the control hydraulic circuit (unlock).

On reaching the point of shift between unlock and lock-up, the first inlet is subjected to a markedly higher pressure than the second inlet. The pressure now acting in the converter housing presses the coupling device together, so that the impeller is positively connected to the turbine wheel (lock-up).

As mentioned above, in order to regulate the slip between the impeller and the turbine wheel during the lock-up, the pressure acting at the first inlet of the converter is varied by means of the control valve.

Since the hydraulic oil is subjected to churning work through the continual movement, the hydraulic oil must constantly be cooled by means of a cooling device located outside the converter. The diversion of the hydraulic oil to the cooler is likewise regulated by means of a control valve, which is often the same one as regulates the flow of the hydraulic oil to the converter.

If the hydrodynamic torque converter is shifted in the "lock-up" state, the oil passages to the torque converter and the line leading to the hydraulic oil cooler are switched over by means of the control valve at the same time.

The control of the flow of the hydraulic oil, which serves in hydrodynamic torque converters to drive the turbine wheel and impeller and to shift the clutches integrated in the torque converters, is performed, as mentioned above, by means of control valves, which are mostly pulse width modulated solenoid valves.

Pulse width modulated solenoid valves for hydrodynamic torque converters are well known. They comprise an electromagnetic switching element and a control valve with a control spool arranged slidably therein which closes and/or opens the various inlets and outlets of the control valve. At the end of the valve body facing the electromagnetic switching element, there is a control pressure chamber with several inlets and outlets. At one of the inlets, the control pressure connection, which is opened and closed by the electromagnetic switching element, a substantially constant control pressure of, for example, 8 bar, is applied. On operation of the electrical switching element, the control pressure connection is opened and the control pressure acting on the control pressure connection displaces the control spool, thereby opening a converter clutch control connection connected to the control pressure chamber. Through this converter clutch control connection, the hydraulic oil flows into the converter housing. Depending on the duration of opening of the control pressure connection, the pressure acting directly at the outlet of the switching element in the control pressure chamber is between 0 bar and the maximum control pressure.

The electrical switching element is operated at a predetermined switching frequency, for example, 40 Hz, while the duration of opening of the control pressure connection per switching pulse, the so-called pulse width, can be varied. By varying the pulse width, the control pressure acting on the clutch unit can be regulated between 0 bar and the maximum value so that the slip between impeller and turbine wheel can be influenced. If the control pressure connection remains open over the whole pulse width, the maximum control pressure acts and the clutch remains closed, while in case of a shorter duration of opening, the control pressure in the converter housing is correspondingly decreased.

The rapid opening of the control pressure connection for short periods of time gives rise to pressure spikes which are propagated through the converter clutch control pressure connection into the converter housing. This leads, on switching of the clutch, to fluctuations in the torque, influenced by the pressure spikes, and to unsteady driving behavior connected therewith.

The pulse width modulated solenoid valves hitherto used in the control unit were not provided with a spring to achieve a "soft" end position at the end of the valve housing remote from the switching element.

Although these solenoid valves operate satisfactorily, they nevertheless lead at all pulse widths to the pressure spikes being passed on and to the torque fluctuations in the drive associated therewith.

SUMMARY OF THE INVENTION

It is an object of the invention to provide a pulse width modulated solenoid valve which makes smoother driving behavior possible.

To this end, in a pulse width modulated solenoid valve for control of hydrodynamic torque converters of automatic transmissions, comprising an electromagnetic switching element and a valve body, wherein the valve body has: an end facing said switching element; an end remote from said switching element; a control pressure chamber for a fluid medium; a control spool having at least one control groove; a control pressure connection to said control pressure chamber for the fluid medium; at least one first pressure connection connecting said control pressure chamber to at least one outlet; at least one second pressure connection connecting at least one working chamber to at least one outlet; at least one counter-pressure chamber located at the opposite end of said valve body to said control pressure chamber; at least one of said pressure connections being capable of being connected to at least one of said outlets through a control groove on said control spool; in accordance with the invention, at least one spring element is arranged in said counter-pressure chamber, said spring element providing a counter-force to dampen high accelerations of said control spool away from the electromagnetic switching element.

Other objects and advantages of the invention will appear from the following description.

Thus, it is advantageous if the pulse width modulated solenoid valve has a control pressure connection connected to said control pressure chamber; a converter clutch control pressure connection connected via said control pressure chamber to a common pressure outlet and to said control pressure connection; a converter clutch supply pressure connection connected via a first working chamber to a cooler outlet; and a supply pressure connection connected via a second working chamber to a converter clutch counter-pressure outlet. Several connections can thereby be connected to one another at the same time, thus reducing the control effort.

It can furthermore be advantageous if the incoming fluid medium is a pressure medium, such as hydraulic oil, since hydraulic oil is, in general, incompressible and at the same time has lubricating properties.

It is also advantageous if the counter-force of the spring element in the counter-pressure chamber towards the magnetic switching element increases as the load increases, since in the case of rapid and high accelerations of the control spool a higher counter-force is required than when the acceleration of the control spool is low.

Preferably, the maximum counter-force of the spring element towards the electromagnetic switching element in the counter-pressure chamber corresponds approximately to the maximum control pressure acting in the control pressure chamber; this is a precaution against overloading the spring element.

For durability, the spring element can preferably consist essentially of metal, ceramic, plastic, in particular a fiber-reinforced plastic, or of composite materials.

It is advantageous to use a compression spring, in particular a helical spring, as the spring element, since compression springs have a linear damping behavior.

It may be advantageous to use a belleville spring as the spring element, since belleville springs have a nonlinear characteristic, and with increasing load, exhibit a correspondingly superproportionally increasing counter-force. At the same time, they are able to dissipate part of the kinetic energy of the control spool by friction in the bearing surface.

Thus, by means of pulse width modulated solenoid valves, in accordance with the invention, reduction in the pressure spikes is possible, whereby fluctuations in torque in the converter, which adversely affect the driving behavior of the motor vehicle, can be avoided.

The spring element stores part of the hydraulic energy set free during the period of opening per switching pulse and gives it up again during the period of closing per switching pulse. Pressure spikes which occur due to the sudden opening of the control pressure connection are damped, whereby pressure fluctuations within the converter housing are reduced and jumps in the transfer of torque are markedly reduced.

DESCRIPTION OF A PREFERRED EMBODIMENT

Figure 1:
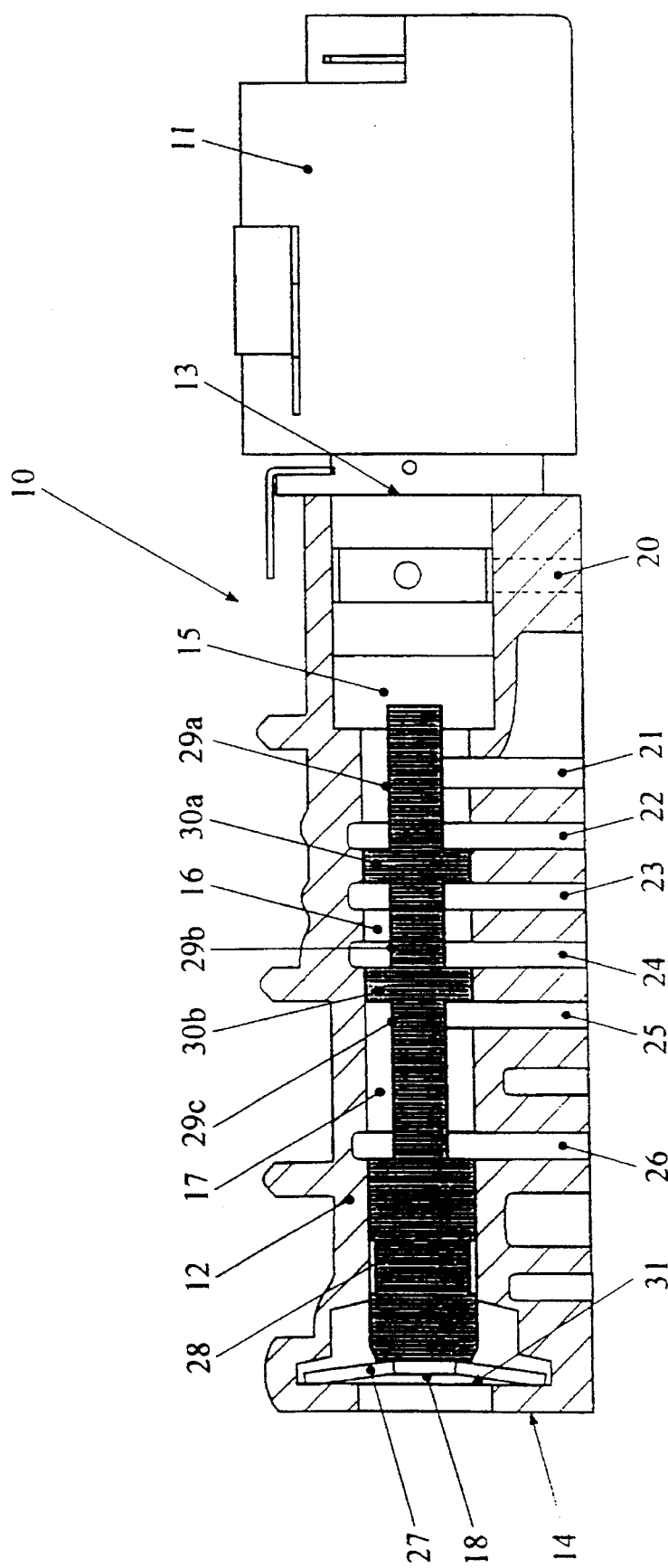
FIG. 1 shows a longitudinal cross section through an embodiment of a pulse width modulated solenoid valve in accordance with the invention, in the "lock-up" state.

A preferred embodiment of a pulse modulated solenoid valve 10 in accordance with the invention, as shown in FIG. 1, comprises an electromagnetic switching element 11 and a valve body 12. The valve body 12, with an end 13 facing the switching element and an end 14 remote from the switching element, has an elongated bore extending towards the end 14 remote from the switching element. The elongated bore is divided by depressions arranged at the circumference of the bore into a control pressure chamber 15 at the end 13 facing the switching element, two working chambers 16 and 17 adjacent thereto and a counter-pressure chamber 18.

Bores 20, 21, 22, 23, 24, 25 and 26 in the valve body 12, running at right angles to the elongated bore, serve as connections for various hydraulic oil lines.

A control spool 28, slidable along the elongated bore and having its end, which faces the switching element, projecting into the control pressure chamber 15, has control grooves 29a, 29b and 29c distributed along its circumference and control lands 30a and 30b. These control grooves 29a, 29b, 29c can, according to whether the solenoid valve 10 is "open" or "closed", connect the various outlets and connections 20, 21, 22, 23, 24, 25 and 26 to one another via the chambers 15, 16 and 17.

At the end 14, remote from the switching element, there is a counter-pressure chamber 18, in which is accommodated a belleville spring 27 which preloads the control spool 28 towards the switching element 11. This belleville spring 27 makes movement of the control spool 28 possible in the "lock-up" state.

Figure 2:
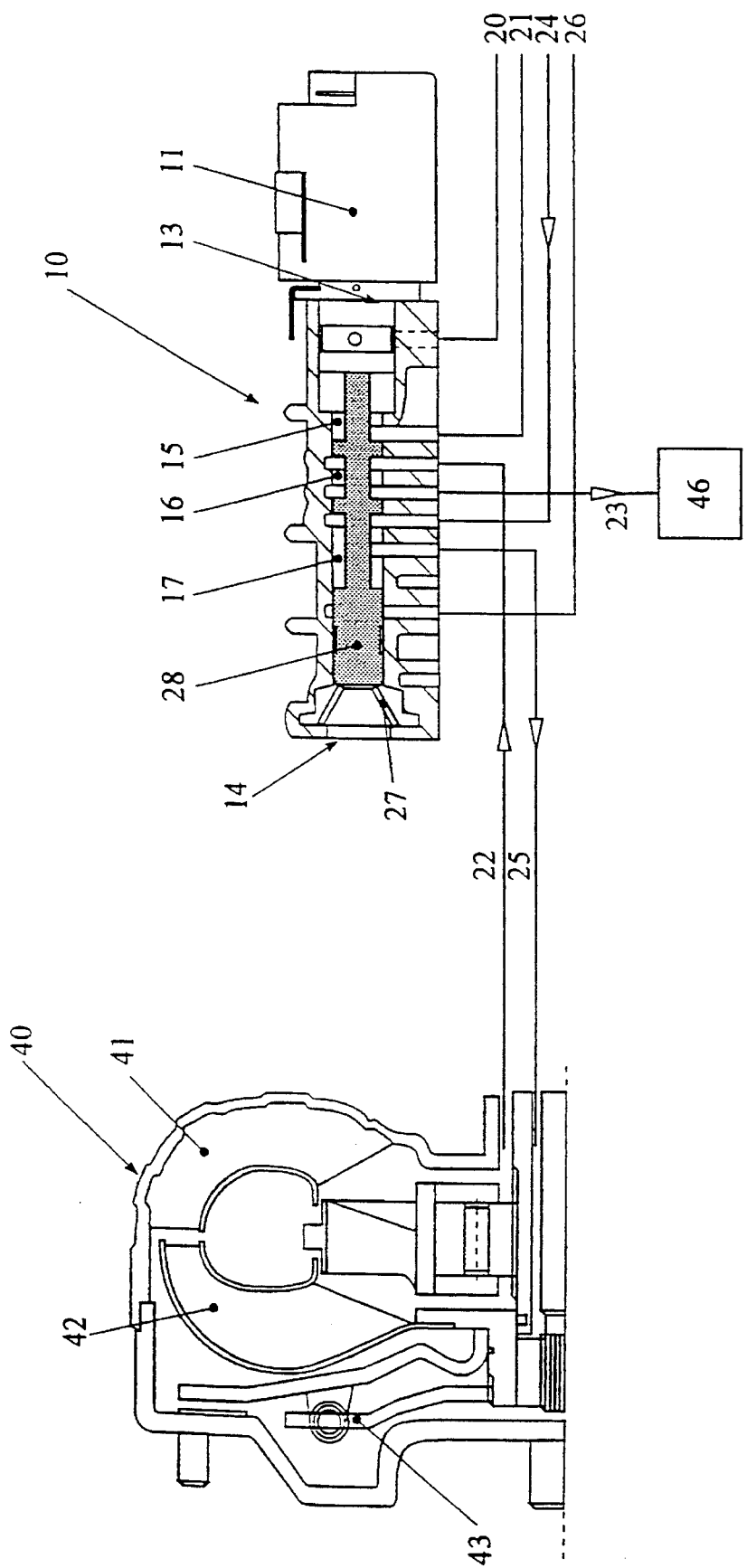
FIG. 2 is a general view of the pressure control system, of a hydrodynamic torque converter in the "unlock" state.
Figure 3:
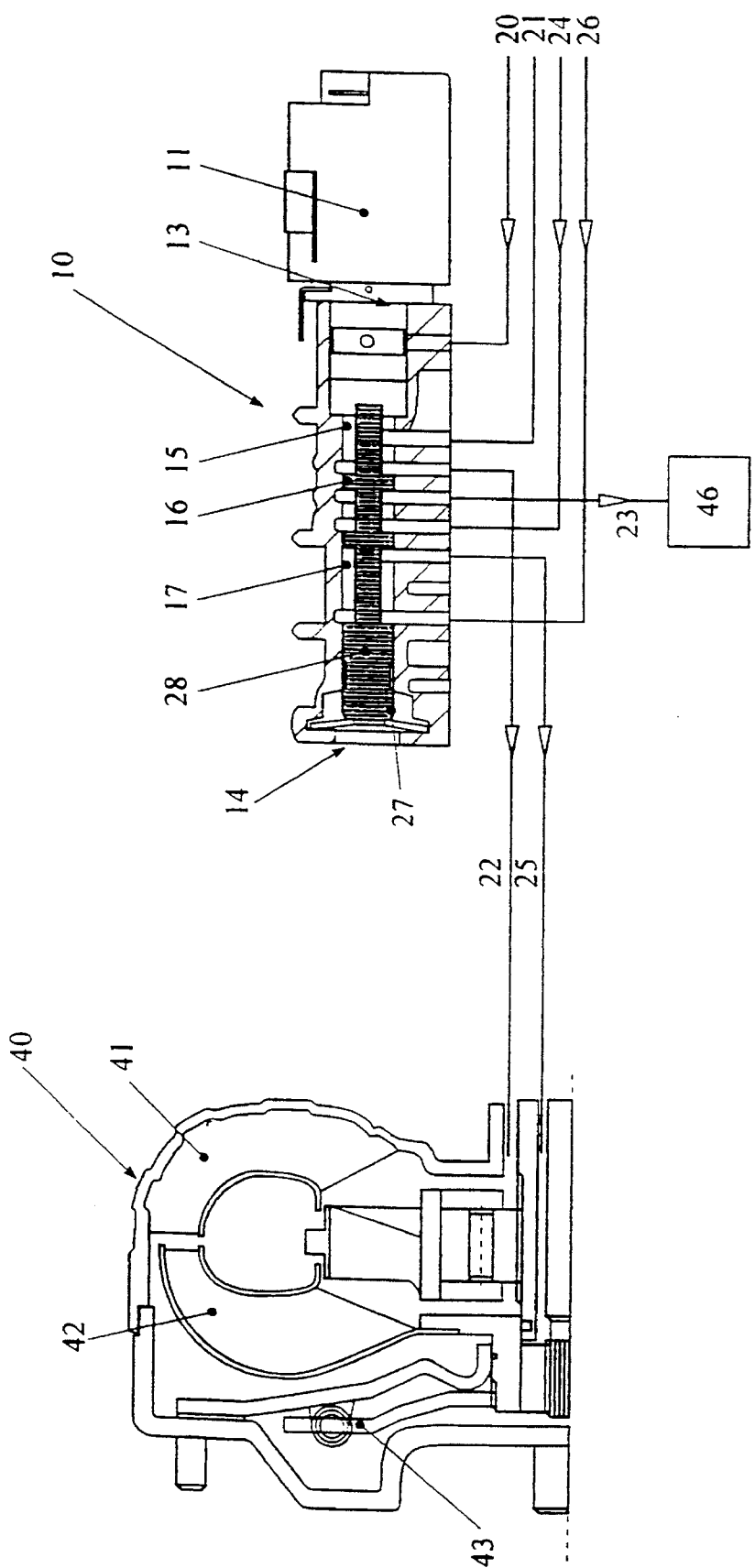
FIG. 3 is a general view of the pressure control system of a hydrodynamic torque converter in the "lock-up" state.

In FIGS. 2 and 3, a known hydrodynamic torque converter 40 is shown connected to a solenoid valve 10, in accordance with the invention. It should be noted that the pulse modulated solenoid valve 10, in accordance with the invention, is not restricted to this type of hydrodynamic torque converter. The torque converter 40 has a rotatably mounted impeller 41 and a turbine wheel 42 rotatably mounted in the converter housing. A clutch device 43 enables a positive connection of the impeller 41 to the turbine wheel 42 to be made, so that in the "lock-up" state, the torque transferred from the drive to the impeller 41 can be passed on to the turbine wheel 42 without loss.

FIG. 2 shows the pressure control system of a hydrodynamic torque converter in the "unlock" state, wherein the solenoid valve 10 of the invention is closed. When the solenoid valve 10 is closed, the electromagnetic switching element 11 blocks the control pressure connection 20, so that the control spool 28 is displaced in the elongated bore towards the end 13 facing the switching element. As a result, hydraulic oil from the converter 40 can flow through the converter clutch control pressure connection 22 via the working chamber 16 formed by the second control groove 29b and the cooler outlet 23 into the cooler 46.

At the same time, the control spool 28 makes it possible to connect the converter clutch supply pressure connection 24, which is subjected to a pressure of up to about 8 bar, via the working chamber 17 to the converter clutch counter-pressure outlet 25. Through the pressure applied to the converter clutch counter-pressure outlet 25, the clutch device 43 in the torque converter 40 is opened, so that the positive connection between the impeller 41 and the turbine wheel 42 is broken. Since there is a lower pressure in the line between the converter housing and the converter clutch control pressure connection 22, the hydraulic oil flows from the converter clutch counter-pressure connection 25 via the clutch device 43 into the converter housing and from there further, via the converter clutch control pressure connection 22, into the cooler 46 (unlock).

FIG. 3 shows the hydrodynamic torque converter in the "lock-up" state with the solenoid valve 10 open. When the solenoid valve 10 is open, the electromagnetic switching element 11 opens the control pressure connection 20, to which a constant pressure of, for example, 8 bar, is applied. Through the hydraulic oil flowing under pressure into the working chamber 15, the control spool 28 is displaced towards the end 14 remote from the switching element. This results in a connection of the converter clutch control pressure connection 22 to the control pressure connection 20 via the working chamber 15. The hydraulic oil at high pressure from the control pressure connection 20 flows through the converter clutch control pressure connection 22 into the housing of the torque converter 40.

At the same time, the control spool 28 enables the converter clutch counter-pressure connection 25 to be connected via the working chamber 17 formed by the third control groove 29c to the supply pressure connection 26, which is subjected to a constant pressure of, for example, 1 bar. This acts via the converter clutch counter-pressure connection 25 on the clutch device 43 in the housing of the converter 40. Through the high pressure acting via the converter clutch control pressure connection 22, the clutch device 43 is preloaded against the pressure acting in the clutch device 43 from the converter clutch counter-pressure connection 25, so that a positive connection of the impeller 41 to the turbine wheel 42 results.

Figure 4:
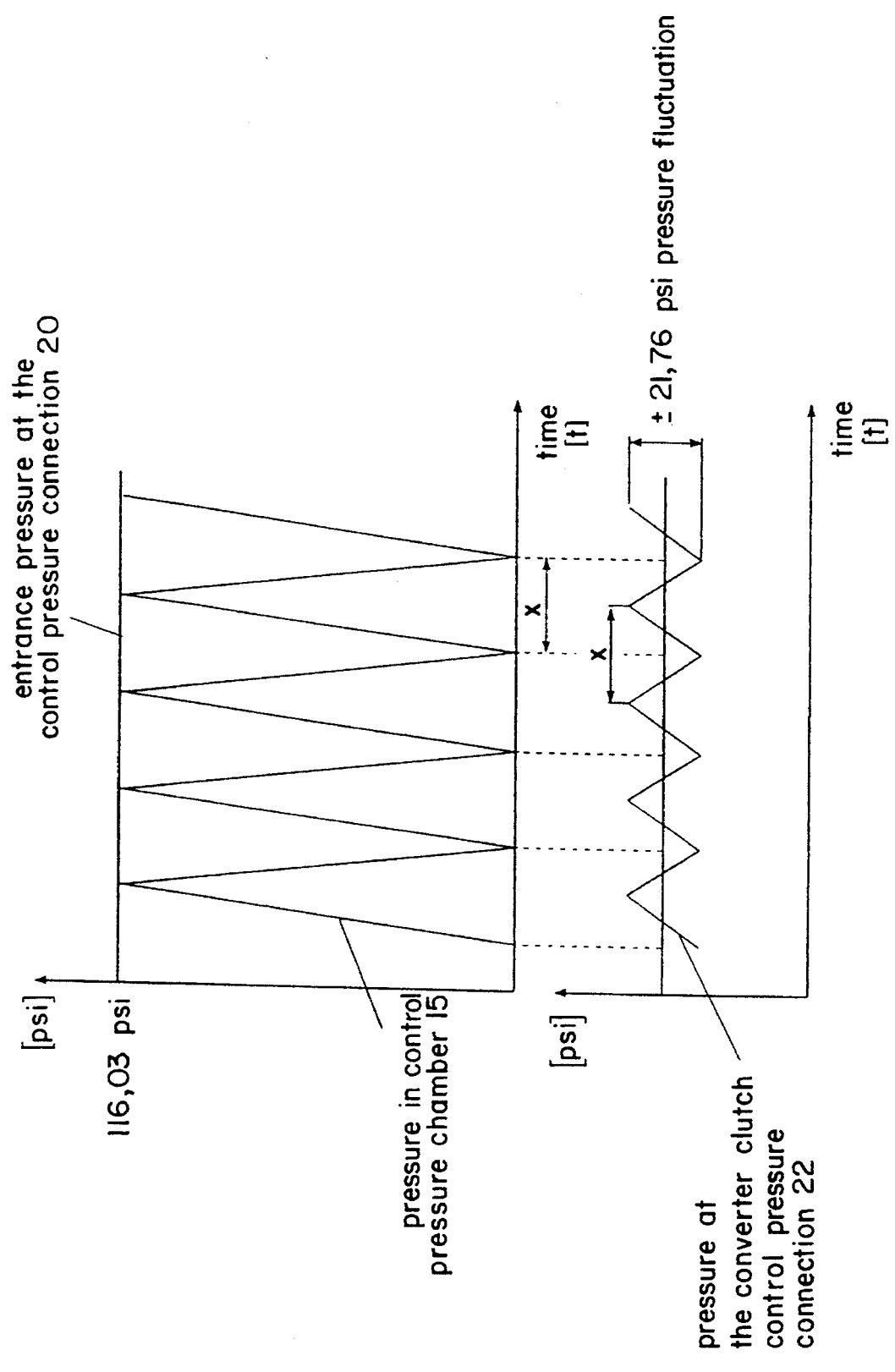
FIG. 4 is a diagram showing the dependence of the pressure fluctuations within the converter on the fluctuations in the control pressure at the control pressure connection.

FIG. 4 shows the connection between the inlet pressure at the control pressure connection 20, the pressure acting in the control pressure chamber 15, and the pressure acting on the clutch device 43 via the converter clutch control pressure connection 22.

Pulse width modulated solenoid valves 10 are operated using a switching pulse frequency which can be from 20 to 80 Hz, for example, up to 40 Hz. The electromagnetic switching element 11 opens and closes the control pressure connection 20 at each switching pulse. The duration of opening of the control pressure connection 20 during a switching pulse, the so-called pulse width x, can comprise a period of time from 0 up to the whole duration of the switching pulse. If a pulse width of 0% is set, the control pressure connection 20 does not open at all during the whole switching pulse. If the pulse width is 100%, the control pressure connection 20 is open during the whole duration of the switching pulse. By means of pulse widths lying between 0% and 100%, pressures can be set which lie between 0 and the maximum control pressure of, for example, 8 bar.

Through the sudden opening of the control pressure connection 20 during a switching pulse, large pressure differences, so-called pressure spikes, quickly occur. These pressure spikes are transmitted through the control pressure chamber 15 via the converter clutch control pressure connection 22 right into the torque converter 40. The use of the belleville spring 27 causes a counter-pressure to act on the control spool 28 which counteracts the pressure shocks. With increasing pressure, the counter-force of the belleville spring 27 increases, so that the pressure oscillations can only build up with reduced amplitude. Accordingly, with small pressure shocks, the deviation movement of the control spool 28, due to the belleville spring 27, is smaller than in the case of large, sudden pressure shocks. The pressure shocks transmitted via the converter clutch control pressure connection 22 to the converter 40 are damped and bring about a smooth torque transmission behavior of the converter 40.

Thus, the belleville spring 22 makes possible, in a simple manner, a clear improvement in the torque transmission behavior of the converter 40 in the event of pressure shocks which suddenly arise due to the system of control.

It is understood that although the form of the invention shown herein and described constitutes the preferred embodiment of the invention, it is not intended to illustrate all possible forms thereof. It will also be understood that words used are words of description rather than a limitation, and that various changes may be made without departing from the spirit and scope of the invention as disclosed.

I claim:

1. A system for controlling an hydrodynamic torque converter for an automatic transmissions, comprising:

an electromagnetic switching element (11);

a valve body (12) having a first end (13) facing said switching element;

a second end (14) remote from said switching element;

a control pressure chamber (15) for a fluid medium;

a control spool movable in the control pressure chamber over a range of motion (28) having at least one control groove (29a);

a control pressure connection (20) to said control pressure chamber (15) for the fluid medium;

a outlet;

working chambers (16, 17);

a first pressure connection (22) connecting said control pressure chamber (15) to said outlet (21);

a second pressure connection (24, 26) connecting at least one working chamber (16, 17) to at least one outlet (23, 25);

a counter-pressure chamber (18) located at the opposite end of said valve body (12) from said control pressure chamber (15), at least one of said pressure connections (20, 22, 24, 26) being capable of being connected to at least one of said outlets (21, 23, 25) through a control groove; and a belleville spring element (27) located in said counter-pressure chamber (18), applying a counter-force to said control spool to inhibit high acceleration of said control spool (28) away from said electromagnetic switching element (11) over the full range of motion of the control spool.

2. A system according to claim 1, further comprising:

a cooler outlet (23);

a converter clutch counter-pressure outlet (25);

a converter clutch control pressure connection (22) connected through said control pressure chamber (15) to a common pressure outlet (21) and to said control pressure connection (20);

a converter clutch supply pressure connection (24) connected through a first working chamber (16) to said cooler outlet (23); and a supply pressure connection (26) connected through a second working chamber (17) to said converter clutch counter-pressure outlet (25).

3. The system according to claim 1, wherein the counter-force applied by said spring element (27) in said counter-pressure chamber (18) towards said electromagnetic switching element (11) increases with increasing load.

4. The system according to claim 1, wherein the maximum counter-force of said spring element (27) in said counter-pressure chamber directed toward said electromagnetic switching element (11) corresponds approximately to the maximum control pressure acting in said control pressure chamber (15).

5. The system according to claim 1, wherein said spring element (27) is formed of a member of the group consisting of metal, ceramic, plastic, fibre-reinforced plastic, or composite materials.

\* \* \* \* \*